United States Patent
Yokono et al.

(10) Patent No.: US 9,057,320 B2
(45) Date of Patent: Jun. 16, 2015

(54) CONTROL DEVICE AND CONTROL METHOD FOR AN INTERNAL COMBUSTION ENGINE

(71) Applicants: Michihisa Yokono, Kobe (JP); Tomokazu Makino, Chiyoda-ku (JP); Takahiko Ono, Kobe (JP)

(72) Inventors: Michihisa Yokono, Kobe (JP); Tomokazu Makino, Chiyoda-ku (JP); Takahiko Ono, Kobe (JP)

(73) Assignee: Mitsubishi Electric Corporation, Tokyo (JP)

(*) Notice: Subject to any disclaimer, the term of this patent is extended or adjusted under 35 U.S.C. 154(b) by 36 days.

(21) Appl. No.: 13/854,245

(22) Filed: Apr. 1, 2013

(65) Prior Publication Data
US 2014/0137552 A1     May 22, 2014

(30) Foreign Application Priority Data
Nov. 22, 2012    (JP) ................. 2012-255970

(51) Int. Cl.
| | |
|---|---|
| F02D 23/00 | (2006.01) |
| F02B 33/44 | (2006.01) |
| F02B 37/18 | (2006.01) |
| F02D 41/00 | (2006.01) |
| F02D 41/10 | (2006.01) |

(52) U.S. Cl.
CPC .............. *F02B 37/183* (2013.01); *F02B 37/18* (2013.01); *F02D 41/0007* (2013.01); *Y02T 10/144* (2013.01); *F02D 41/10* (2013.01); *F02D 2200/0406* (2013.01); *F02D 2200/101* (2013.01); *F02D 2200/602* (2013.01); *F02D 2200/703* (2013.01)

(58) Field of Classification Search
CPC ......... F02B 37/18; F02B 37/183; F02B 37/00
USPC ......................... 60/602, 605.1; 701/102, 110
See application file for complete search history.

(56) References Cited

FOREIGN PATENT DOCUMENTS

| JP | 2005-054750 A | 3/2005 |
|---|---|---|
| JP | 2006-274831 A | 10/2006 |
| JP | 2010-038093 A | 2/2010 |

OTHER PUBLICATIONS

Japanese Office Action, Oct. 8, 2013, Patent Application No. 2012-255970.

*Primary Examiner* — Thai Ba Trieu
*Assistant Examiner* — Ngoc T Nguyen
(74) *Attorney, Agent, or Firm* — Sughrue Mion, PLLC; Richard C. Turner

(57) ABSTRACT

Provided is a control device for an internal combustion engine, which improves acceleration performance while maintaining fuel performance in a non-supercharging operation range. A bypass passage (33) which bypasses a turbine (32c, 32d) of a supercharger is provided. In the bypass passage (33), a wastegate valve (33a) for adjusting a flow-path area of the bypass passage (33) by a wastegate actuator (33b) is provided. For an operation in the non-supercharging operation range, an opening degree of the wastegate valve (33a) is set to fully close the wastegate valve (33a) when a ratio of a pressure (Pb) of an intake manifold (22) and an atmospheric pressure (P1) is smaller than a threshold value.

10 Claims, 5 Drawing Sheets

EXAMPLE OF SETTING OF P2/P1 LIMIT VALUE

CONTROL DEVICE AND CONTROL METHOD FOR AN INTERNAL COMBUSTION ENGINE

BACKGROUND OF THE INVENTION

1. Field of the Invention

The present invention relates to a control device and a control method for an internal combustion engine, and more particularly, to a control device for an internal combustion engine in which a supercharger is mounted, for example.

2. Description of the Related Art

There has been known a turbocharger having a supercharger that operates by rotating a turbine by using an exhaust gas, which is mounted in an intake passage of an internal combustion engine (hereinafter referred to simply as "engine") for the purpose of improvement of an output of the engine. In the following, an operation range in which supercharging is performed by the supercharger is referred to as a supercharging operation range, whereas an operation range in which the supercharging is not performed by the supercharger is referred to as a non-supercharging operation range.

In a state in which the engine rotates at a high speed under a high load, The turbocharger has a fear in that a supercharging pressure is increased to become larger than needed with the result that the engine is broken. Therefore, in general, an exhaust bypass passage is provided upstream of the turbine. In the exhaust bypass passage, a wastegate valve (hereinafter referred to as "WGV") is provided. The WGV diverts a part of the exhaust gas flowing through an exhaust passage to the exhaust bypass passage so as to adjust an inflow of the exhaust gas into the turbine. In this manner, a pressure (supercharging pressure) in an intake passage of the engine is controlled to an appropriate level.

In general, the WGV is driven by using a positive-pressure actuator. The mechanism of driving the WGV is as follows. Specifically, the intake passage of the engine (particularly, an upstream portion of a throttle valve, in which the pressure increases) and a wastegate actuator (hereinafter referred to as "WGA") are connected to each other. When the pressure in the intake passage of the engine becomes higher than an atmospheric pressure, an operation of the WGA is enabled. In general, the WGV, which is a bypass valve, is maintained in a fully-closed position until the operation of the WGA is enabled.

The turbine provided in the exhaust passage blocks the passage of the exhaust gas from a combustion chamber, and therefore becomes a factor for an increase in exhaust pressure. As the exhaust pressure increases, an exhaust loss becomes larger to lower the efficiency of the engine.

With a conventional configuration, an opening degree of the WGV cannot be operated unless the pressure in the intake passage of the engine increases. Therefore, when the pressure in the intake passage such as that during the operation of the engine in the non-supercharging operation range is equal to or lower than a predetermined value, the WGV is not operated even when an opening-degree changing request for the WGV is issued. Therefore, the efficiency of the engine is lowered.

In view of the above-mentioned situation, in recent years, there has been proposed a system including a motorized WGA, which is capable of operating the WGV when needed regardless of the pressure in the intake passage (for example, see Japanese Patent Application Laid-open No. 2006-274831).

The exhaust loss can be reduced by opening the WGV during the operation of the engine in the non-supercharging operation range. As a result, the engine efficiency is enhanced to improve fuel consumption. However, a turbine rpm is lowered with the reduction in exhaust pressure. Therefore, when an acceleration request is subsequently issued, turbo lag becomes longer. As a result, there arises a problem in that acceleration performance of the engine is degraded.

Thus, according to one of the conventional technologies, the opening degree of the WGV is set to about 20% (WGV opening-degree: full closure=0% and full opening=100%) when the engine operates in the non-supercharging operation range. By fully closing the WGV in response to the acceleration request using an accelerator signal, a supercharging-pressure response (acceleration responsiveness) at the time of acceleration is ensured while the fuel consumption is improved.

However, the method described in Japanese Patent Application Laid-open No. 2006-274831 has the following problem. In a low engine-load range included in the non-supercharging operation range, the acceleration responsiveness at the time of acceleration is degraded by opening the WGV by 20%.

SUMMARY OF THE INVENTION

The present invention has been made to solve the problems described above, and it is an object of the present invention to provide a control device and a control method for an internal combustion engine, capable of improving acceleration performance while maintaining fuel performance.

According to an exemplary embodiment of the present invention, there is provided a control device for an internal combustion engine, the internal combustion engine including: a throttle valve provided in an intake passage of the internal combustion engine; a supercharger including a turbine provided in an exhaust passage of the internal combustion engine and a compressor provided upstream of the throttle valve in the intake passage, the compressor being configured to rotate integrally with the turbine; a wastegate valve provided in a bypass passage, the bypass passage being provided to the exhaust passage so as to bypass the turbine; a wastegate-valve driving section for changing a flow-path sectional area of the bypass passage by driving the wastegate valve; an intake-manifold pressure detecting section for detecting a pressure of an intake manifold provided downstream of the throttle valve; an atmospheric-pressure detecting section for detecting an atmospheric pressure outside of the internal combustion engine; an accelerator operation-amount detecting section for detecting an operation amount of an accelerator by a driver; and an rpm sensor for detecting an rpm of the internal combustion engine, the control device including: an operation-range detecting section for determining, based on the operation amount of the accelerator and the rpm of the internal combustion engine, whether an operation range requested by the driver is a supercharging operation range or a non-supercharging operation range; a Pb/P1 comparing section for determining whether a ratio of the pressure of the intake manifold and the atmospheric pressure is smaller than a threshold value when the operation range is the non-supercharging operation range; a WGV opening-degree calculating section for calculating a target opening degree of the wastegate valve based on the ratio of the pressure of the intake manifold and the atmospheric pressure; and a WGV opening-degree adjusting section for adjusting an opening degree of the wastegate valve based on the target opening degree calculated by the WGV opening-degree calculating section, in which the WGV opening-degree calculating section calculates, as a full-closure value, the target opening degree of the wastegate valve when the ratio of the pressure of the intake manifold and the atmospheric pressure is smaller than the threshold value.

The control device for an internal combustion engine according to the exemplary embodiment of the present invention, the internal combustion engine including: the throttle valve provided in the intake passage of the internal combustion engine; the supercharger including the turbine provided in the exhaust passage of the internal combustion engine and the compressor provided upstream of the throttle valve in the intake passage, the compressor being configured to rotate integrally with the turbine; the wastegate valve provided in the bypass passage, the bypass passage being provided to the exhaust passage so as to bypass the turbine; the wastegate-valve driving section for changing the flow-path sectional area of the bypass passage by driving the wastegate valve; the intake-manifold pressure detecting section for detecting the pressure of the intake manifold (Pb) provided downstream of the throttle valve; the atmospheric-pressure detecting section for detecting the atmospheric pressure (P1) outside of the internal combustion engine; the accelerator operation-amount detecting section for detecting the operation amount of the accelerator by the driver; and the rpm sensor for detecting the rpm of the internal combustion engine, includes: the operation-range detecting section for determining, based on the operation amount of the accelerator and the rpm of the internal combustion engine, whether the operation range requested by the driver is the supercharging operation range or the non-supercharging operation range; a Pb/P1 comparing section for determining whether the ratio of the pressure of the intake manifold and the atmospheric pressure is smaller than the threshold value when the operation range is the non-supercharging operation range; the WGV opening-degree calculating section for calculating the target opening degree of the wastegate valve based on the ratio of the pressure of the intake manifold and the atmospheric pressure; and the WGV opening-degree adjusting section for adjusting the opening degree of the wastegate valve based on the target opening degree calculated by the WGV opening-degree calculating section, in which the WGV opening-degree calculating section calculates, as the full-closure value, the target opening degree of the wastegate valve when the ratio of the pressure of the intake manifold and the atmospheric pressure is smaller than the threshold value. Therefore, it is possible to improve the acceleration performance while maintaining the fuel economy.

DETAILED DESCRIPTION OF THE PREFERRED EMBODIMENT

First Embodiment

Figure 1:
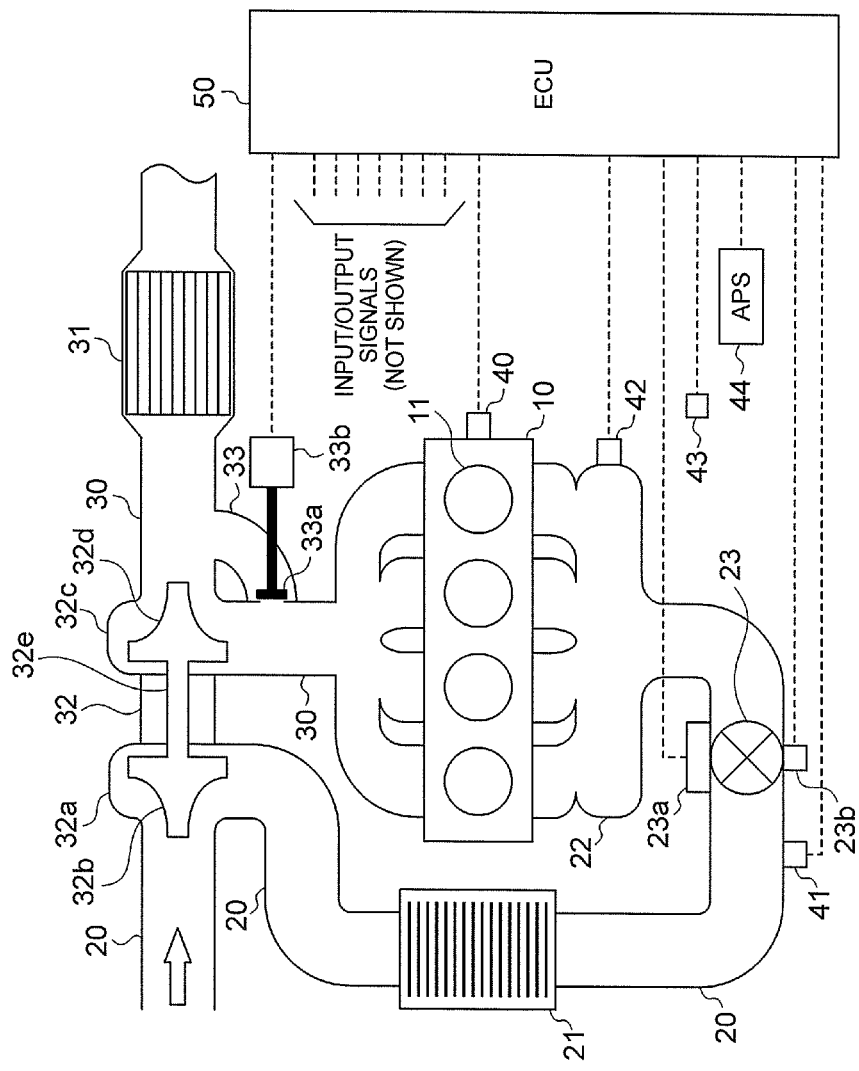
FIG. 1 is a configuration diagram illustrating an internal combustion engine and a control device therefor according to a first embodiment of the present invention.

In the following, a control device for an internal combustion engine according to an embodiment of the present invention is described referring to the accompanying drawings. FIG. 1 is a diagram illustrating a schematic configuration of an internal combustion engine (hereinafter referred to simply as "engine") and a control device therefor according to a first embodiment of the present invention.

An engine 10 includes a plurality of combustion chambers 11. An intake passage 20 and an exhaust passage 30 are connected to the engine 10 through an intake manifold 22. To the exhaust passage 30, a turbine housing 32c of a turbocharger 32 is provided. In a region of the exhaust passage 30, which is located upstream of the turbine housing 32c (hereinafter referred to simply as "upstream region") is coupled to a region of the exhaust passage 30, which is located downstream of the turbine housing 32c (hereinafter referred to simply as "downstream region") through a bypass passage 33. A part of an exhaust gas bypasses the turbine housing 32c to flow through the bypass passage 33. In a portion at which the "upstream region" and the bypass passage 33 are connected, there is provided a wastegate valve (hereinafter referred to as "WGV") 33a, which is capable of adjusting the flow-path area of the bypass passage 33. The WGV 33a is driven by a wastegate actuator (hereinafter referred to as "WGA") 33b. A catalyst 31 is provided downstream of a portion at which the "downstream region" and the bypass passage 33 are connected.

A compressor housing 32a of the turbocharger 32 is provided to the intake passage 20. An intercooler 21 is provided downstream of the compressor housing 32a. A throttle valve (hereinafter referred to as "THV") 23 is provided to the intake passage 20 on the downstream side of the intercooler 21. The intake passage 20 is connected to the engine 10 through the intake manifold 22.

The THV 23 is opened and closed by a throttle motor 23a. An opening degree of the THV 23 is output by a throttle-position sensor (hereinafter referred to as "TPS") 23b.

A P2 sensor 41 for detecting a pressure in the intake passage 20 at the upstream of the throttle valve (the intake passage pressure is hereinafter referred to as "P2") is provided to a portion of the intake passage 20, which is located between the compressor housing 32a and the throttle valve 23. A Pb sensor 42 for detecting a pressure of the intake manifold 22 (the intake manifold pressure is hereinafter referred to as "Pb") is mounted to the intake manifold 22.

A P1 sensor 43 for detecting an atmospheric pressure (hereinafter referred to as "P1") is provided outside of the engine 10. A value of P1 can be estimated from values of Pb and P2 depending on the operation conditions, however, an estimated value may be used without detecting P1.

In the turbocharger 32, a centrifugal turbine includes the turbine housing 32c and a turbine wheel 32d provided in the turbine housing 32c. A centrifugal compressor includes the compressor housing 32a and a compressor wheel 32b provided in the compressor housing 32a. The turbine wheel 32d and the compressor wheel 32b are coupled by a turbine shaft 32e. When the turbine wheel 32d is rotationally driven by the exhaust gas, the compressor wheel 32b is also rotationally driven simultaneously so as to supercharge intake air present in the intake passage 20. As described above, the centrifugal turbine (32c, 32d) and the centrifugal compressor (32a, 32b) constitute a supercharger.

An electronic control unit (hereinafter referred to as "ECU") 50 is provided to the engine 10. To the ECU 50, there are input signals (hereinafter referred to as "detection signals") from an NE sensor 40 for detecting a crank rpm (hereinafter referred to as "NE"), an accelerator position sensor (hereinafter referred to as "APS") 44 for detecting the amount of operation of an accelerator performed by a driver, and various sensors (not shown) for respectively detecting a water temperature, an intake temperature, and a vehicle speed. The driving of the throttle motor 23a and actuators such as the WGA 33b is controlled by the ECU 50.

The ECU 50 is formed by a microcomputer including a CPU, a ROM, and a RAM as a main component and executes various types of control programs stored in the ROM to implement various types of control over the engine 10 with respect to an operating state of the engine 10 each time. Specifically, the detection signals from the plurality of sensors described above are input to the ECU 50, and based on the detection signals input as needed, a fuel injection amount and ignition timing are calculated to drive a fuel injection device and an ignition device.

The ECU 50 also calculates a target throttle opening degree by calculating an engine output requested by the driver based on detection signals from various sensors including the throttle position sensor (TPS) 23b. The ECU 50 drives the throttle motor 23a based on the target throttle opening degree to adjust the opening degree of the throttle valve (THV) 23. Further, the ECU 50 executes WGV opening-degree control in parallel to the throttle opening-degree control so as to achieve the WGV opening degree requested each time. An engine output requested by the driver is realized by the throttle opening-degree control and the WGV opening-degree control.

As described above, in the non-supercharging operation range, an exhaust loss can be reduced by opening the WGV 33a to improve fuel consumption. The effect of reducing the exhaust loss becomes greater as the flow-path area of the bypass passage 33 becomes larger. Therefore, a fully-open state of the WGV 33a is the best state for the improvement of fuel consumption. Therefore, in the non-supercharging operation range, the fuel performance tends to degrade as the opening degree of the WGV 33a is changed to be closed.

Figure 6:
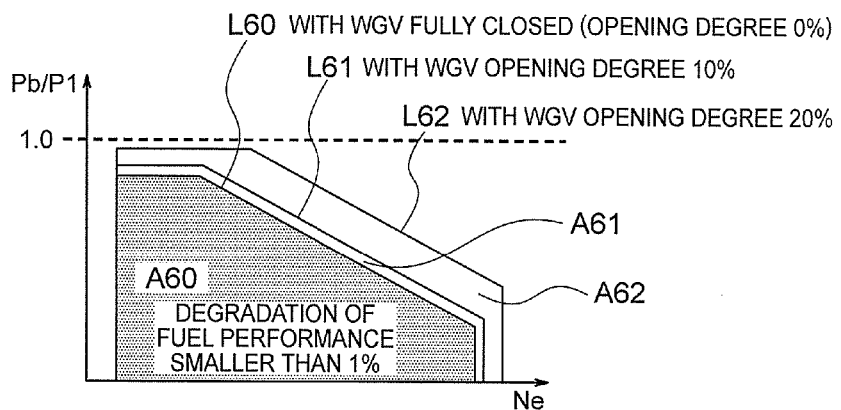
FIG. 6 is a graph showing a range in which the degree of degradation of fuel performance is smaller than 1% in the control device for the internal combustion engine according to the first embodiment of the present invention.

A horizontal axis of FIG. 6 indicates NE, whereas a vertical axis indicates a ratio Pb/P1. As described above, in the non-supercharging operation range, the fully-open state of the WGV 33a is considered as the best state for the improvement of fuel consumption. Therefore, based on the fuel performance when the engine 10 operates with the WGV 33a fully open, the degree of degradation of fuel performance varied by changing the opening degree of the WGV 33a (20%, 10%, 0% (fully-closed state)) is measured. FIG. 6 shows a range in which the degree of degradation of fuel performance at each of the opening degrees of the WGV 33a is smaller than 1%. When the engine 10 is operated with the opening degree of the WGV 33a being set to 20%, a solid line L62 is a boundary indicating the degradation of fuel performance by 1%. A range A62 bordered by the boundary is an operation range in which the degree of degradation of the fuel performance is smaller than 1%. A boundary obtained in the same measurement which is carried out with the opening degree of the WGV 33a set to 10% is a solid line L61. An operation range in which the degree of degradation of the fuel performance is smaller than 1% is a range A61. A boundary obtained in the same measurement which is carried out with the WGV 33a fully closed is a solid line L60, and an operation range in which the degree of degradation of the fuel performance is smaller than 1% is a range A60.

From the results of measurements shown in FIG. 6, the following is understood. In the non-supercharging operation range, the fuel performance tends to degrade by closing the WGV 33a. However, in a low-load operation range, the fuel performance is not affected or less affected even when the WGV 33a is fully closed. The fact shows the following. Specifically, the turbine wheel 32d is provided in the exhaust passage 30. Therefore, when the WGV 33a is fully closed, the turbine wheel 32d blocks the passage of the exhaust gas. In a region where a flow rate of the exhaust gas is small, however, the degree of blockage of the passage of the exhaust gas is also small under the effects of characteristics of the turbocharger 32 such as the area of a gap between an inner wall of the turbine housing 32c and the turbine wheel 32d, and hence the exhaust loss is less affected.

Figure 7:
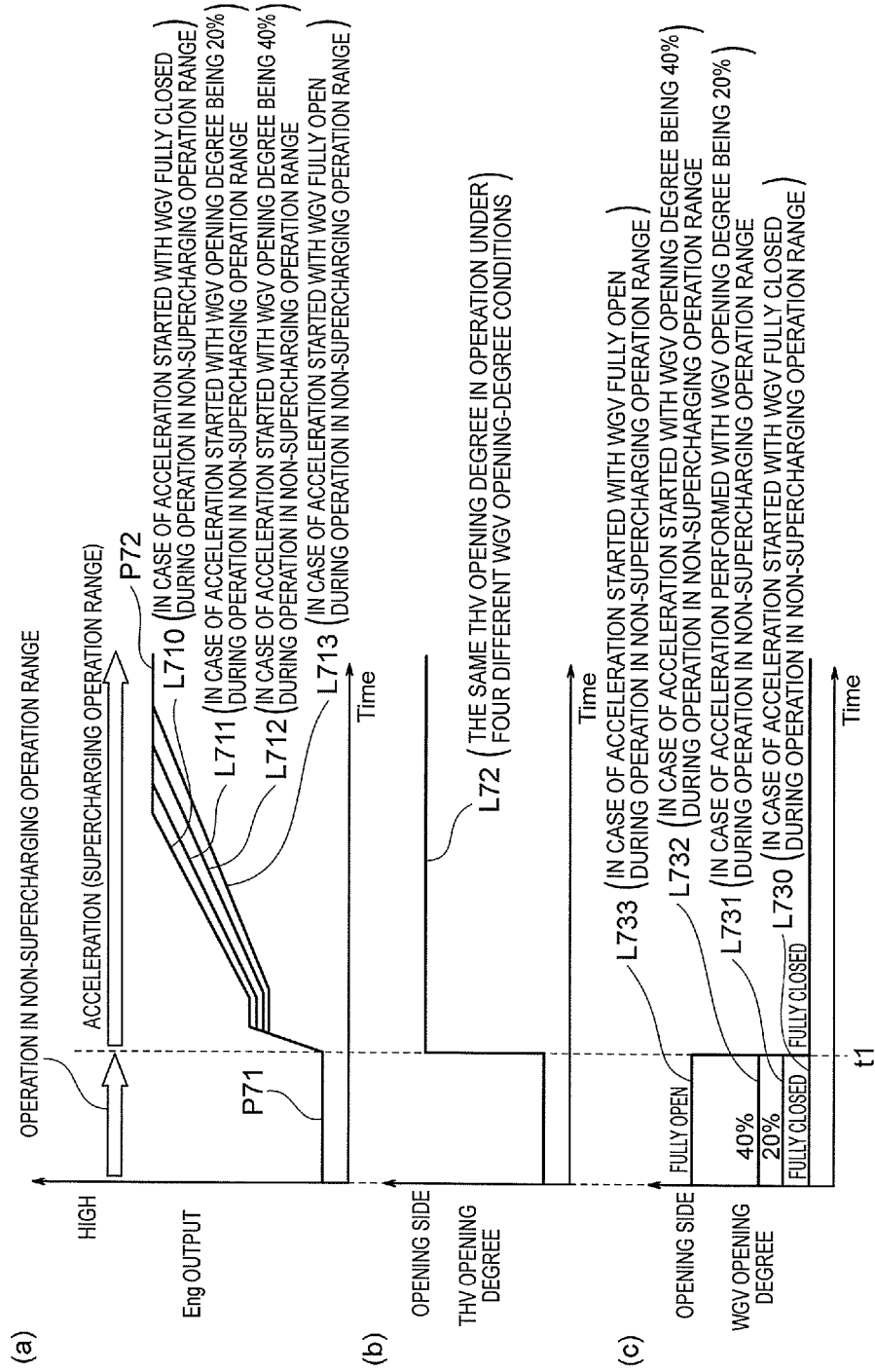
FIGS. 7(a) to 7(c) are timing charts illustrating comparison of acceleration responsiveness when an acceleration operation is performed in a non-supercharging operation range so that the internal combustion engine subsequently operates in a supercharging operation range in the control device for the internal combustion engine according to the first embodiment of the present invention.

Further, FIGS. 7A to 7C show the results of comparison of acceleration responsiveness in accordance with the opening-degree state of the WGV 33a during the operation in the non-supercharging operation range when the acceleration operation is performed in the non-supercharging operation range so that the engine 10 subsequently operates in the supercharging operation range. A horizontal axis of FIG. 7A indicates time, whereas a vertical axis indicates the output of the engine 10. A horizontal axis of FIG. 7B indicates time, whereas a vertical axis indicates the THV opening degree. A horizontal axis of FIG. 7C indicates time, whereas a vertical axis indicates the WGV opening degree.

In FIGS. 7A to 7C, before timing t1, the engine 10 operates in the non-supercharging operation range. At timing t1, the THV 23 and the WGV 33a are operated by the ECU 50, and the engine 10 is accelerated to be operated in the supercharging operation range. Operation conditions in the non-supercharging operation range before timing t1 are as follows. Specifically, the effect of the opening degree of the WGV 33a on the fuel performance is smaller than 1%, and the operation is performed in the range A60 shown in FIG. 6. The acceleration responsiveness in the non-supercharging operation range is now compared under four different opening-degree conditions of the WGV 33a (0% (fully-closed state), 20%, 40%, and 100% (fully-open state)). Even though the engine 10 is operated under the four different opening-degree conditions of the WGV 33a in the non-supercharging operation range, the opening degree of the WGV 33a after timing t1 is 0% (fully-closed state).

For example, in the case where the acceleration is started when the engine 10 is operating in the non-supercharging operation range with the opening degree of the WGV 33a being 100% (fully-open state), the acceleration operation is performed at timing t1. Therefore, the THV 23 is opened so as to increase an intake air amount to the engine 10. A behavior of the THV 23 at this time is indicated by a solid line L72 of FIG. 7B. In accordance with the THV opening operation at timing t1, the ECU 50 operates the WGV 33a, which is in the fully-open state, so as to fully close the WGV 33a, as indicated by a solid line L733 of FIG. 7C. In this manner, the intake air amount to the engine 10 increases. As a result, the output of the engine 10 gradually increases from P71 to P72. A behavior of the engine output at this time is indicated by a line L713 of FIG. 7A.

Even in the case where the acceleration is started when the engine 10 operates in the non-supercharging operation range with the opening degree of the WGV 33a being 40%, the air amount for realizing the same engine output from P71 to P72 is the same. Therefore, the behavior of the THV 23 is indicated by the same solid line L72 as in the above-mentioned case. The behavior of the WGV 33a is indicated by a solid line L732 of FIG. 7C. The opening degree until timing t1 is 40%, and the opening degree after timing t1 becomes 0% (fully-closed state). An output behavior of the engine 10 in the acceleration operation is indicated by a solid line L712. It is understood that higher acceleration responsiveness is obtained as compared with the case where the acceleration is started when the engine 10 operates in the non-supercharging operation range with the opening degree of the WGV 33a being 100% (fully-open state).

Even in the case where the acceleration is started when the engine 10 operates in the non-supercharging operation range with the opening degree of the WGV 33a being 20%, the air amount for realizing the same engine output from P71 to P72 is the same. Therefore, the behavior of the THV 23 is indicated by the same solid line L72 as in the above-mentioned cases. The behavior of the WGV 33a is indicated by a solid line L731 of FIG. 7C. The opening degree until timing t1 is 20%, and becomes 0% (fully-closed state) after timing t1. An output behavior of the engine 10 in the acceleration operation is indicated by a solid line L711. It is understood that higher acceleration responsiveness is obtained as compared with the case where the acceleration is started when the engine 10 operates in the non-supercharging operation range with the opening degree of the WGV 33a being 40%.

Even in the case where the acceleration is started when the engine 10 operates in the non-supercharging operation range with the opening degree of the WGV 33a being 0% (fully-closed state), similarly, the behavior of the THV 23 is indicated by the same solid line L72 as in the above-mentioned cases. The behavior of the WGV 33a is indicated by a solid line L730. The opening degree until timing t1 and the opening degree after timing t1 are always 0% (fully-closed state). An output behavior of the engine 10 in the acceleration operation is indicated by a solid line L710. It is understood that higher acceleration responsiveness is obtained as compared with the case where the acceleration is started when the engine 10 operates in the non-supercharging operation range with the opening degree of the WGV 33a being 20%. Specifically, the highest acceleration responsiveness is obtained in the case where the acceleration is started with the opening degree of the WGV 33a being 0% (fully-closed state).

The results of FIGS. 7A to 7C show the following. Specifically, even in the case where the effect of the opening-degree state of the WGV 33a during the operation in the non-supercharging operation range on the fuel performance is small, the exhaust flow rate to the turbine wheel 32d varies depending on the opening-degree state of the WGV 33a. Therefore, the rpm of the turbine wheel 32d when the engine 10 operates in the non-supercharging operation range differs. As a result, the opening-degree state of the WGV 33a during the operation in the non-supercharging operation range affects the supercharging responsiveness at the time of acceleration.

Figure 2:
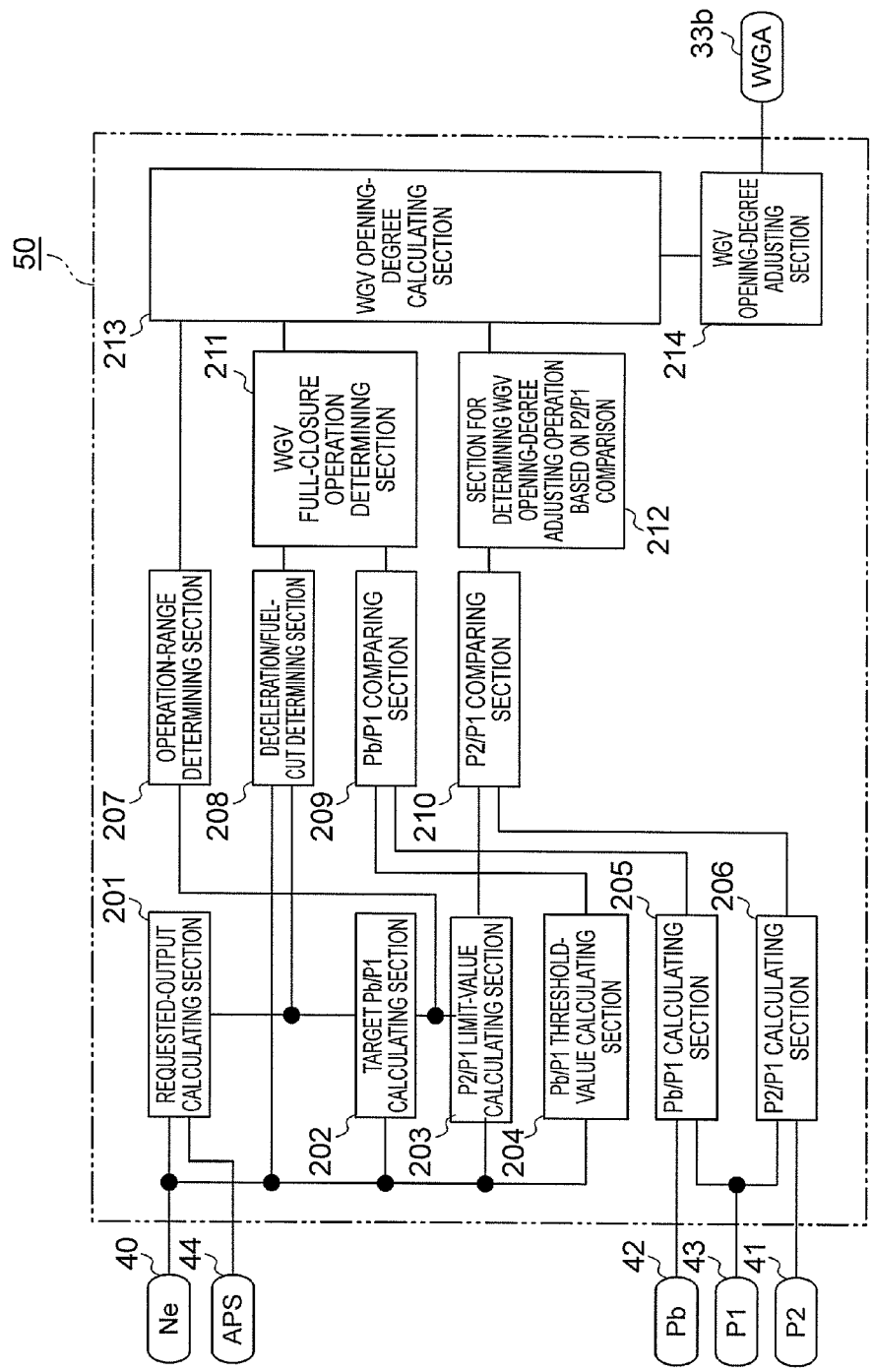
FIG. 2 is a block diagram illustrating the configuration of the control device for the internal combustion engine according to the first embodiment of the present invention.

Next, the contents of control realized by the ECU 50 are described referring to FIG. 2. FIG. 2 is a block diagram illustrating a configuration for implementing a WGV control function by the ECU 50 when the engine 10 operates in the non-supercharging operation range.

The ECU 50 includes a requested-output calculating section 201, a target Pb/P1 calculating section 202, a P2/P1 limit-value calculating section 203, a Pb/P1 threshold-value calculating section 204, a Pb/P1 calculating section 205, a P2/P1 calculating section 206, an operation-range determining section 207, a deceleration/fuel-cut determining section 208, a Pb/P1 comparing section 209, a P2/P1 comparing section 210, a WGV full-closure operation determining section 211, a section 212 for determining WGV opening-degree adjusting operation based on P2/P1 comparison, a WGV opening-degree calculating section 213, and a WGV opening-degree adjusting section 214. In the following, each of the sections is described.

The requested-output calculating section 201 calculates an output of the engine requested by the driver (hereinafter referred to as "requested engine output") based on the detection signals from the NE sensor 40 and the APS 44. As a calculation method, the requested engine output may be computed by a predetermined mathematical expression or may be obtained by using a table which stores a value of the requested engine output for each value of NE and each value of the accelerator operation amount.

To the target Pb/P1 calculation section 202, the detection signal from the NE sensor 40 and the requested engine output calculated by the requested-output calculating section 201 are input. The target Pb/P1 calculating section 202 calculates a target Pb/P1 value required to realize the requested engine output based on the requested engine output and an operating state of the engine based on the detection signal from NE sensor 40. As a calculation method, the target Pb/P1 value may be calculated by a predetermined mathematical expression or may be obtained by using a table which stores a value of the target Pb/P1 for each value of NE and each value of the requested engine output.

The operation-range determining section 207 determines, based on the target Pb/P1 value calculated by the target Pb/P1 calculating section 202, whether an operation range requested by the driver is the supercharging operation range or the non-supercharging operation range. Specifically, for example, when the target Pb/P1 value is smaller than a threshold value (for example, 1.0), the operation-range determining section 207 determines that the requested operation range is the non-supercharging operation range. On the other hand, when the target Pb/P1 value is equal to or larger than the threshold value, the operation-range determining section 207 determines that the requested operation range is the supercharging operation range.

The deceleration/fuel-cut determining section 208 receives an input of the detection signal from the NE sensor 40 and an input of the requested engine output calculated by the requested-output calculating section 201 to determine, based on the requested engine output and the operating state of the engine 10 which is determined based on the detection signal from the NE sensor 40, whether or not deceleration/fuel-cut processing is currently being performed. The deceleration/fuel-cut processing is processing for decelerating a crank rpm and reducing the fuel injection amount from the fuel injection device. Therefore, for example, when the crank rpm is equal to or larger than a predetermined value and the fuel injection amount is equal to or smaller than a predetermined value, the deceleration/fuel-cut determining section 208 determines that the deceleration/fuel-cut processing is currently being performed.

Figure 4:
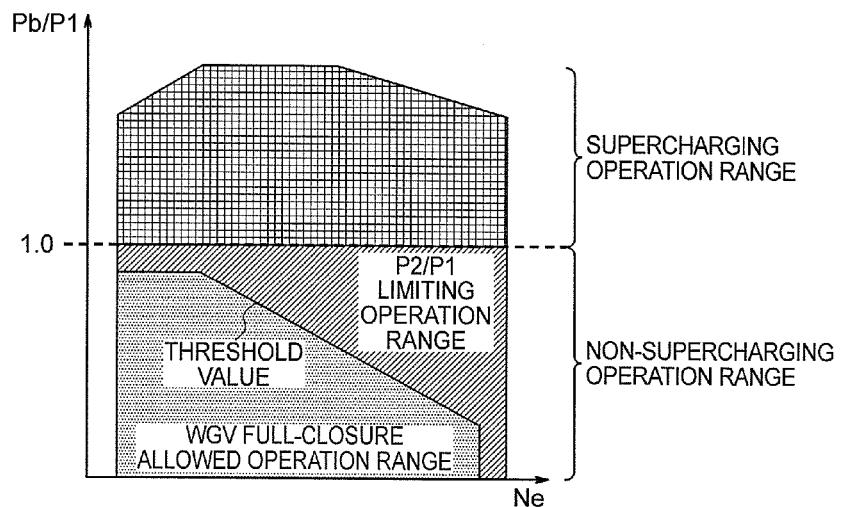
FIG. 4 is a graph showing an operation range by the control device for the internal combustion engine according to the first embodiment of the present invention.

The Pb/P1 threshold-value calculating section 204 receives an input of the detection signal from the NE sensor 40 to calculate a threshold value for determining a WGV full-closure allowed operation range in the operating state of the engine 10 based on the operating state of the engine 10, which is determined based on the detection signal from the NE sensor 40. In the following, the WGV full-closure allowed operation range is described. The WGV full-closure allowed operation range is an operation range in which the fuel performance is not affected or less affected even when the WGV is fully closed. For example, FIG. 4 shows each operation range when a horizontal axis indicates NE during the operation of the engine 10 and a vertical axis indicates the ratio Pb/P1. A range in which the value of Pb/P1 is smaller than 1.0 is the non-supercharging operation range, whereas a range in which the value of Pb/P1 is equal to or larger than 1.0 is the supercharging operation range. The non-supercharging operation range is further divided into two ranges. One of the two ranges is the WGV full-closure allowed operation range in which the WGV is allowed to be fully closed. The other one is a P2/P1 limiting operation range in which the WGV is not allowed to be fully closed. A load during the operation of the engine 10 is small in the WGV full-closure allowed operation range. Therefore, even when the WGV is fully closed, the fuel performance is not affected or less affected. The Pb/P1 threshold-value calculating section 204 calculates a boundary between the WGV full-closure allowed operation range and the P2/P1 limiting operation range as a threshold value for determining the WGV full-closure allowed operation range in the current operating state of the engine 10. As a calculation method, for example, a value of the boundary indicating the range in which the degree of degradation of fuel performance is smaller than 1% as shown in FIG. 6 may be obtained by using a table prestored for each opening degree of the WGV.

The Pb/P1 calculating section 205 receives Pb input from the Pb sensor 42 and P1 input from the P1 sensor 43 to calculate a ratio of Pb and P1 (Pb/P1).

The Pb/P1 comparing section 209 compares a threshold value for determining the WGV full-closure allowed operation range calculated in the Pb/P1 threshold-value calculating section 204 and the Pb/P1 value calculated in the Pb/P1 calculating section 205 to determine whether or not the engine 10 is currently operating in the WGV full-closure allowed operation range. Specifically, when the Pb/P1 value is equal to or smaller than the threshold value, the Pb/P1 comparing section 209 determines that the engine 10 is currently operating in the WGV full-closure allowed operation range. On the other hand, when the Pb/P1 value is larger than the threshold value, the Pb/P1 comparing section 209 determines that the engine 10 is currently operating in the P2/P1 limiting operation range.

The WGV full-closure operation determining section 211 determines that the WGV full-closure operation is to be performed when the deceleration/fuel-cut determining section 208 determines that the deceleration/fuel-cut processing is currently being implemented or the Pb/P1 comparing section 209 determines that the engine is currently operating in the WGV full-closure operation range.

Figure 5:
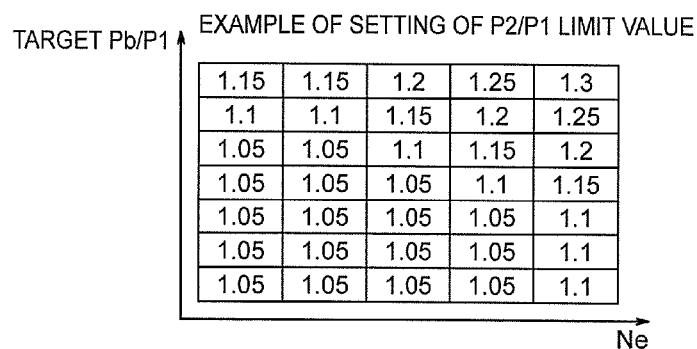
FIG. 5 is a table showing an example of setting of a P2/P1 limit value in the control device for the internal combustion engine according to the first embodiment of the present invention.

To the P2/P1 limit-value calculating section 203, the detection signal from the NE sensor 40 and the target Pb/P1 value calculated in the target Pb/P1 calculating section 202 are input. The P2/P1 limit-value calculating section 203 calculates a limit value of the P2/P1 value, allowing an intake-air supercharging state to be achieved by the turbocharger 32, which less affects the fuel consumption (the effect on fuel consumption is allowed) in the non-supercharging operation range, based on the target Pb/P1 value and the operating state of the engine based on the detection signal from the NE sensor 40. As shown in FIG. 6 referred to above, even in the operating state in which the fuel performance is degraded by 1% or more by fully closing the WGV as compared to the fuel consumption obtained when the WGV is fully open, the degradation of the fuel consumption can be reduced to 1% or smaller by slightly opening the WGV. Even in this state, the intake air is supercharged by the turbocharger 32. Therefore, as compared to the case where the WGV is fully closed, the value of P2/P1 is 1.0 or larger although the value of P2/P1 becomes smaller. For example, FIG. 5 shows an example of setting of a P2/P1 limit value when a horizontal axis indicates Ne during the operation of the engine 10 and a vertical axis indicates the value of the target Pb/P1. In the table of FIG. 5, the P2/P1 limit value is set, which indicates the maximum value of the P2/P1 value in the supercharging-state range in which the fuel consumption is less affected (the effect on the fuel performance is allowed) in the operating state of the engine 10. The P2/P1 limit-value calculating section 203 calculates the P2/P1 limit value, for example, by using the table of FIG. 5.

The P2/P1 calculating section 206 receives P2 input from the P2 sensor 41 and P1 input from the P1 sensor 43 to calculate a ratio of P2 and P1 (P2/P1).

The P2/P1 comparing section 210 compares the P2/P1 limit value calculated in the P2/P1 limit-value calculating section 203 and the P2/P1 value calculated in the P2/P1 calculating section 206. Specifically, the P2/P1 comparing section 210 determines whether the P2/P1 value is within a range obtained by providing a predetermined dead zone to the P2/P1 limit value, or smaller or larger than the range obtained by providing the predetermined dead zone to the P2/P1 limit value.

The section 212 for determining WGV opening-degree adjusting operation based on P2/P1 comparison determines a method of adjusting the opening degree of the WGV 33a in accordance with the relationship between the P2/P1 limit value and the P2/P1 value based on the result of comparison performed in the P2/P1 comparing section 210, for example, as described below.

(1) When the P2/P1 value is within the range obtained by providing the predetermined dead zone to the P2/P1 limit value, the opening degree of the WGV 33a is determined to be maintained.

(2) When the P2/P1 value is smaller than the range obtained by providing the predetermined dead zone to the P2/P1 limit value, the opening degree of the WGV 33a is determined to be operated to the closing side by a predetermined amount.

(3) When the P2/P1 value is larger than the range obtained by providing the predetermined dead zone to the P2/P1 limit value, the opening degree of the WGV 33a is determined to be operated to the opening side by a predetermined amount.

The WGV opening-degree calculating section 213 receives inputs of the result of determination by the operation-range determining section 207, the result of determination by the WGV full-closure operation determining section 211, and the result of determination by the section 212 for determining WGV opening-degree adjusting operation based on P2/P1 comparison, to thereby calculate a target opening degree of the WGV 33a (hereinafter referred to as "WGV target opening degree") in the following manner based on the input results of determination.

(I) When the operation-range determining section 207 determines that the requested operation range is the non-supercharging operation range and the WGV full-closure operation determining section 211 determines that the WGV full-closure operation is to be performed, the target opening degree of the WGV 33a is calculated as zero (fully-closed state).

(II) When the operation-range determining section 207 determines that the requested operation range is the non-supercharging operation range and the WGV full-closure operation determining section 211 does not determine that the WGV full-closure operation is to be performed, the following operation is performed by using the result of determination by the section 212 for determining WGV opening-degree adjusting operation based on P2/P1 comparison. Specifically, (1) when it is determined that the opening degree of the WGV 33a is to be kept, the WGV target opening degree is not changed, (2) when it is determined that the WGV 33a is to be operated to the closing side by the predetermined amount, the WGV target opening degree is set to a value shifted to the closing side by the predetermined amount, and (3) when it is determined that the WGV 33a is to be operated to the opening side by the predetermined amount, the WGV target opening degree is set to a value shifted to the opening side by the predetermined amount.

For the WGV target opening degree, an upper limit and a lower limit are clipped by a full-closure value and a full-opening value.

The WGV opening-degree adjusting section 214 operates the WGA 33b so that the opening degree of the WGV 33a becomes equal to the WGV target opening degree calculated by the WGV opening-degree calculating section 213.

Figure 3:
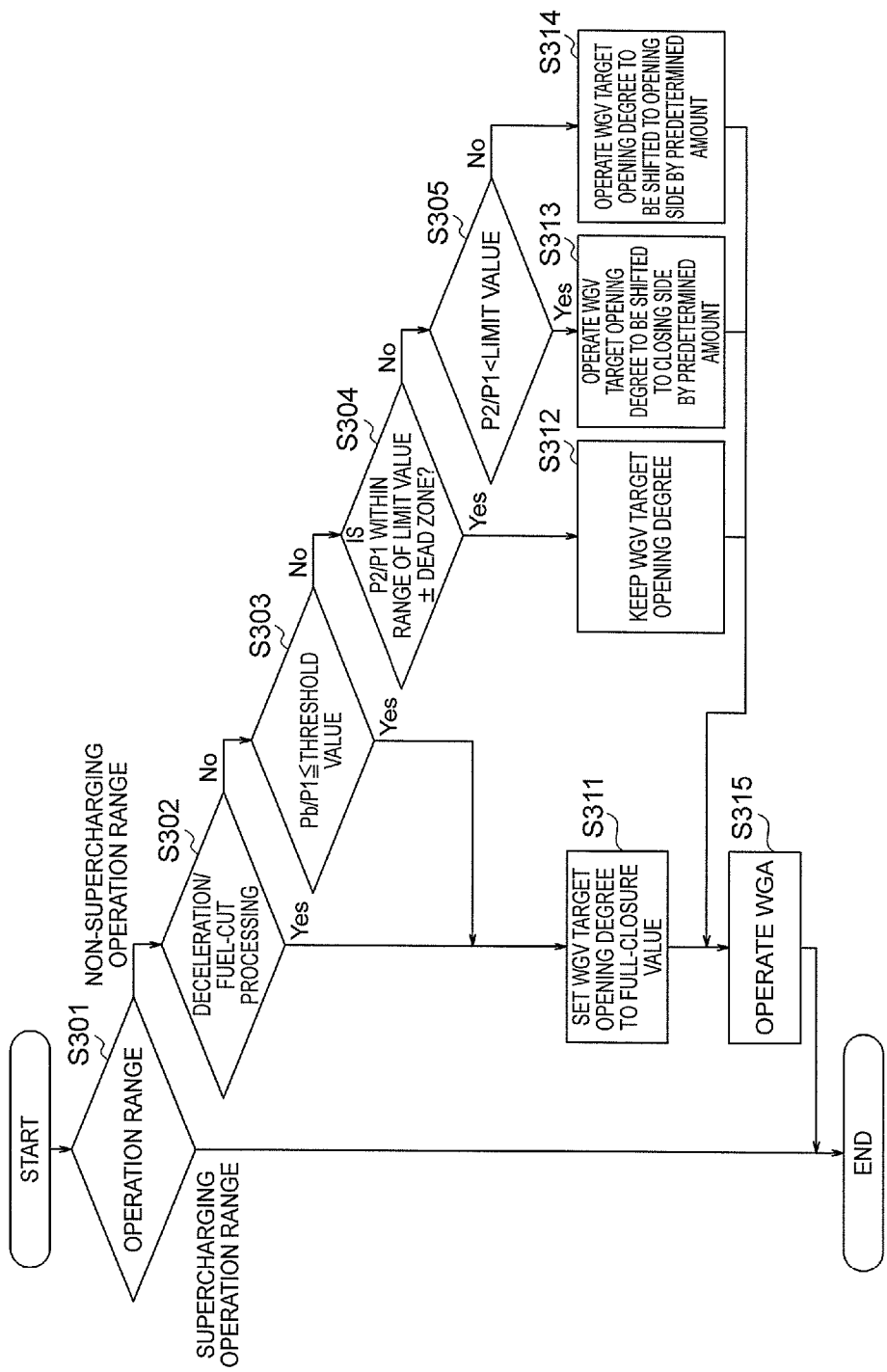
FIG. 3 is a flowchart illustrating a flow of processing performed by the control device for the internal combustion engine according to the first embodiment of the present invention.

The contents of control realized by the ECU 50 are described referring to FIG. 3. FIG. 3 is a flowchart illustrating WGV control processing performed by the ECU 50 when the engine 10 operates in the non-supercharging operation range. The illustrated processing is repeatedly executed at predetermined time intervals.

In Step S301, the operation-range determining section 207 determines whether the operation range requested by the driver is the supercharging operation range or the non-supercharging operation range. When the operation range requested by the driver is the supercharging operation range, the WGV control processing in the non-supercharging operation range is terminated. On the other hand, when the operation range requested by the driver is the non-supercharging operation range, the processing proceeds to Step S302.

In Step S302, the deceleration/fuel-cut determining section 208 determines whether or not the engine 10 is currently operated while the deceleration/fuel-cut processing is being performed. When the deceleration/fuel-cut processing is being performed, the processing proceeds to Step S311. When the deceleration/fuel-cut processing is not being performed, the processing proceeds to Step S303.

In Step S303, the Pb/P1 comparing section 209 determines whether or not the Pb/P1 value in the current operating state is equal to or smaller than the threshold value for determining the WGV full-closure allowed operation range. When the Pb/P1 value is equal to or smaller than the threshold value, the processing proceeds to Step S311. When the Pb/P1 value is not equal to or smaller than the threshold value, the processing proceeds to Step S304.

In Step S304, the P2/P1 comparing section 210 determines whether or not the P2/P1 value in the current operating state is within the range obtained by providing the predetermined dead zone to the P2/P1 limit value indicating the maximum value of the P2/P1 value in the current operating state. When the P2/P1 value is within the range, the processing proceeds to Step S312. On the other hand, the P2/P1 value is not within the range, the processing proceeds to Step S305.

In Step S305, the P2/P1 comparing section 210 determines whether or not the P2/P1 value in the current operating state is smaller than the range obtained by providing the predetermined dead zone to the P2/P1 limit value indicating the maximum value of the P2/P1 value in the current operating state. When the P2/P1 value is smaller than the range, the processing proceeds to Step S313. When the P2/P1 value is not smaller than the range, the processing proceeds to Step S314.

In Step S311, the WGV opening-degree calculating section 213 sets the target opening degree of the WGV 33a to the full-closure value. Then, the processing proceeds to Step S315.

In Step S312, the WGV opening-degree calculating section 213 does not change the target opening degree of the WGV 33a from the current target opening degree. Then, the processing proceeds to Step S315.

In Step S313, the WGV opening-degree calculating section 213 sets the target opening degree of the WGV 33a to a value obtained by shifting the current target opening degree to the closing side by the predetermined amount. Then, the processing proceeds to Step S315. When the WGV target opening degree becomes smaller than the full-closure value of the WGV in this step, the full-closure value is set as the WGV target opening degree.

In Step S314, the WGV opening-degree calculating section 213 sets the target opening degree of the WGV 33a to a value obtained by shifting the current target opening degree to the opening side by the predetermined amount. Then, the processing proceeds to Step S315. When the WGV target opening degree becomes larger than the full-opening value of the WGV in this step, the full-opening value is set as the WGV target opening degree.

In Step S315, the WGV opening-degree adjusting section 214 operates the WGA 33b so that the opening degree of the WGV 33a becomes equal to the target opening degree of the WGV 33a.

As described above, in the control device for an internal combustion engine according to this embodiment, the internal combustion engine includes the throttle valve (THV) 23 provided in the intake passage 20 of the engine 10, the supercharger including the turbine (32c, 32d) provided in the exhaust passage 30 of the engine 10 and the compressor (32a, 32b) which is configured to rotate integrally with the turbine and provided in the intake passage 20 at the upstream of the throttle valve 23, the wastegate valve (WGV) 33a provided in the bypass passage 33 provided to the exhaust passage 30 so as to bypass the turbine, the wastegate actuator (WGA) 33b (wastegate valve driving section) for changing the flow-path sectional area of the bypass passage 33 by driving the wastegate valve 33a, the intake-manifold pressure sensor 42 provided downstream of the throttle valve 23 so as to detect the pressure of the intake manifold 22, the atmospheric-pressure sensor 43 for detecting the atmospheric pressure of the exterior of the engine 10, the accelerator position sensor 44 (accelerator operation-amount detecting section) for detecting the accelerator operation amount by the driver, and the crank rpm sensor 40 (rpm sensor) for detecting the rpm of the engine 10. The control device includes the operation-range determining section 207 for determining whether the operation range requested by the driver is the supercharging operation range or the non-supercharging operation range based on the accelerator operation amount and the rpm of the engine 10, the Pb/P1 comparing section 209 for determining whether or not the ratio (Pb/P1) of the pressure of the intake manifold 22 and the atmospheric pressure is smaller than the threshold value when the operation range is the non-supercharging operation range, the WGV opening-degree calculating section 213 for calculating the target opening degree of the wastegate valve 33a based on the ratio of the pressure of the intake manifold 22 and the atmospheric pressure, and the WGV opening-degree adjusting section 214 for adjusting the opening degree of the wastegate valve 33a based on the target opening degree calculated by the WGV opening-degree calculating section 213. The WGV opening-degree calculating section 213 calculates, as the full-closure value, the target opening degree of the wastegate valve 33a when the ratio of the pressure of the intake manifold 22 and the atmospheric pressure is smaller than the threshold value.

As described above, by fully closing the WGV during the operation in the WGV full-closure allowed operation range included in the non-supercharging operation range, the rpm of the turbine wheel 32d can be maintained while the fuel performance is maintained. Therefore, the acceleration responsiveness can be ensured.

Moreover, by adjusting the WGV opening degree in accordance with the P2/P1 value in the operating state, specifically, in accordance with the actual supercharging state by the turbocharger 32 with the use of the P2/P1 limit value indicating the maximum value of the P2/P1 value in the supercharging-state range in which the fuel performance is less affected (the effect on the fuel performance is allowed) in the operating state, the acceleration responsiveness can be ensured while the fuel performance is maintained without being affected by an individual difference in supercharging performance, which is generated by a tolerance in fabrication of the turbocharger 32 or a change with time caused by the operation.

Further, when the deceleration/fuel-cut processing is being performed in the non-supercharging operation range, the rpm of the turbine wheel 32d can be maintained without affecting the fuel performance by fully closing the WGV. Therefore, the acceleration responsiveness can be ensured after the recovery from the deceleration/fuel-cut processing. As a result, by keeping the rpm of the turbine high without affecting the fuel consumption, the acceleration performance at the time of recovery from the fuel cut can be ensured.

It is preferred that, in the non-supercharging operation range in which the WGV 33a is not allowed to be fully closed, the ECU 50 control the opening degree of the WGV 33a to the closing side within a range that the ratio of the throttle upstream pressure and the atmospheric pressure does not exceed the threshold value. As a result, in the range in which the efficiency of the engine (fuel consumption) is affected or greatly affected, by fully closing the WGV when the engine is operating in the non-supercharging operation range, the WGV opening degree can be adjusted to a value which can minimize the effect on the fuel consumption and allows the rpm of the turbine to be kept high without being affected by the individual difference in the supercharging performance of the turbine and the compressor, which are mounted to the engine.

What is claimed is:

1. A control method which controls an internal combustion engine, comprising:
    determining, based on an operation amount of an accelerator operated by a driver and an rpm of the internal combustion engine, whether an operation range requested by the driver is a supercharging operation range or a non-supercharging operation range;
    determining whether a ratio of the pressure of an intake manifold and an atmospheric pressure is smaller than a threshold value when the operation range is the non-supercharging operation range;
        calculating a target opening degree of a wastegate valve provided in a bypass passage of an exhaust passage, based on the ratio of the pressure of the intake manifold and the atmospheric pressure; and
        adjusting an opening degree of the wastegate valve based on the calculated target opening degree,
    wherein the calculating, as a full-closure value, the target opening degree of the wastegate valve when the ratio of the pressure of the intake manifold and the atmospheric pressure is smaller than the threshold value.

2. A control device which controls an internal combustion engine comprising:
    a non-transitory computer readable medium having software code stored thereon to execute operations of:
    determining whether an operation range requested by the driver is a supercharging operation range or a non-supercharging operation range based on an operation amount of an accelerator by a driver and an rpm of the internal combustion engine;
    determining whether a ratio of a pressure of an intake manifold and an atmospheric pressure is smaller than a threshold value when the operation range is the non-supercharging operation range;
    calculating a target opening degree of a wastegate valve provided in a bypass passage of an exhaust passage, based on the determined ratio of the pressure of the intake manifold and the atmospheric pressure; and
    adjusting an opening degree of the wastegate valve based on the target opening degree,
    wherein the calculating comprises calculating, as a full-closure value, the target opening degree of the wastegate valve when the ratio of the pressure of the intake manifold and the atmospheric pressure is smaller than the threshold value.

3. The control device for an internal combustion engine according to claim 2, wherein the internal combustion engine comprises a throttle upstream pressure sensor configured to detect a pressure upstream of a throttle valve provided in an intake passage of the internal combustion engine, and
    the throttle upstream pressure sensor being provided in the intake passage located between a supercharger and the throttle valve; and
wherein the non-supercharging operation range includes a first region in which the wastegate valve is allowed to be fully closed and a second region in which the wastegate valve is not allowed to be fully closed; and
    wherein the operations further comprise setting the target opening degree of the wastegate valve to fully close the wastegate valve in the first region and setting the target opening degree of the wastegate valve to a value which allows the wastegate valve to be closed by a predetermined amount so that the ratio of the pressure upstream of the throttle valve provided in an intake passage of the internal combustion engine and the atmospheric pressure does not exceed a threshold value in the second region.

4. The control device for an internal combustion engine according to claim 3, wherein the operations further comprise based on the operation amount of the accelerator and the rpm of the internal combustion engine, determining whether or not deceleration/fuel-cut processing is being performed,
    wherein the setting comprises setting the opening degree of the wastegate valve to fully close the wastegate valve regardless of the ratio of the pressure of the intake manifold and the atmospheric pressure when the deceleration/fuel-cut processing is being performed.

5. The control device for an internal combustion engine according to claim 2, wherein the operations further comprise determining, based on the operation amount of the accelerator and the rpm of the internal combustion engine, whether or not deceleration/fuel-cut processing is being performed, wherein the calculating comprises setting the opening degree of the wastegate valve to fully close the wastegate valve regardless of the ratio of the pressure of the intake manifold and the atmospheric pressure when the deceleration/fuel-cut processing is being performed.

6. A control device for an internal combustion engine, which comprises:
- a throttle valve provided in an intake passage of the internal combustion engine;
- a supercharger including a turbine provided in an exhaust passage of the internal combustion engine and a compressor provided upstream of the throttle valve in the intake passage, the compressor being configured to rotate integrally with the turbine;
- a wastegate valve provided in a bypass passage, the bypass passage being provided to the exhaust passage so as to bypass the turbine;
- an intake-manifold pressure sensor detecting a pressure of an intake manifold provided downstream of the throttle valve;
- an atmospheric-pressure sensor detecting an atmospheric pressure outside of the internal combustion engine;
- an accelerator position sensor detecting an operation amount of an accelerator by a driver; and
- an rpm sensor for detecting an rpm of the internal combustion engine,
- the control device having software stored on a non-transitory computer readable medium to execute operations of:
  - determining whether an operation range requested by the driver is a supercharging operation range or a non-supercharging operation range based on the operation amount of the accelerator and the rpm of the internal combustion engine as previously detected;
  - determining whether a ratio of the pressure of the intake manifold and the atmospheric pressure as previously detected is smaller than a threshold value when the operation range is the non-supercharging operation range;
  - determining a target opening degree of the wastegate valve based on the ratio of the pressure of the intake manifold and the atmospheric pressure as previously detected, wherein the target opening degree of the wastegate valve is equal to a full-closure value when the ratio of the pressure of the intake manifold an the atmospheric pressure as previously detected is smaller than the threshold value; and
  - actuating the wastegate valve by a wastegate actuator to adjust an opening degree of the wastegate valve as previously detected and changing a flow-path sectional area of the by-pass passage based on the target opening degree as previously determined.

7. The control device for an internal combustion engine according to claim 6, wherein the internal combustion engine comprises a throttle upstream pressure sensor configured to detect a pressure upstream of a throttle valve, and the throttle upstream pressure sensor being provided in the intake passage located between a supercharger and the throttle valve;
- wherein the non-supercharging operation range includes a first region in which the wastegate valve is allowed to be fully closed and a second region in which the wastegate valve is not allowed to be fully closed; and
- wherein the control devices has the software to further execute an operation of setting the target opening degree of the wastegate valve to fully close the wastegate valve in the first region and setting the target opening degree of the wastegate valve to a value which allows the wastegate valve to be closed by a predetermined amount so that the ratio of the pressure upstream of the throttle valve provided in an intake passage of the internal combustion engine and the atmospheric pressure does not exceed a threshold value in the second region.

8. The control device for an internal combustion engine according to claim 6, wherein the control device has the software to further execute the operations of:
- determining, based on the operation amount of the accelerator and the rpm of the internal combustion engine, whether or not deceleration/fuel-cut processing is being performed, and
- setting the opening degree of the wastegate valve to fully close the wastegate valve regardless of the ratio of the pressure of the intake manifold and the atmospheric pressure when the deceleration/fuel-cut processing is being performed.

9. The control device for an internal combustion engine according to claim 7, wherein the control device has the software to further execute the operations of:
- determining, based on the operation amount of the accelerator and the rpm of the internal combustion engine, whether or not deceleration/fuel-cut processing is being performed, and
- setting the opening degree of the wastegate valve to fully close the wastegate valve regardless of the ratio of the pressure of the intake manifold and the atmospheric pressure when the deceleration/fuel-cut processing is being performed.

10. An internal combustion engine system, which comprises:
- an internal combustion engine comprising:
  - a throttle valve provided in an intake passage of the internal combustion engine; a supercharger including a turbine provided in an exhaust passage of the internal combustion engine and a compressor provided upstream of the throttle valve in the intake passage, the compressor being configured to rotate integrally with the turbine;
  - a wastegate valve provided in a bypass passage, the bypass passage being provided to the exhaust passage so as to bypass the turbine;
  - an intake-manifold pressure sensor detecting a pressure of an intake manifold provided downstream of the throttle valve;
  - an atmospheric-pressure sensor detecting an atmospheric pressure outside of the internal combustion engine;
  - an accelerator position sensor detecting an operation amount of an accelerator by a driver; and
  - an rpm sensor for detecting an rpm of the internal combustion engine; and
- a control device having software stored on a non-transitory computer readable medium to execute operations of:
  - determining whether an operation range requested by the driver is a supercharging operation range or a non-supercharging operation range based on the operation amount of the accelerator and the rpm of the internal combustion engine as previously detected;
  - determining whether a ratio of the pressure of the intake manifold and the atmospheric pressure as previously detected is smaller than a threshold value when the operation range is the non-supercharging operation range;
  - determining a target opening degree of the wastegate valve based on the ratio of the pressure of the intake manifold and the atmospheric pressure as previously detected, wherein the target opening degree of the wastegate valve is equal to a full-closure value when the ratio of the pressure of the intake manifold an the atmospheric pressure as previously detected is smaller than the threshold value; and actuating the wastegate valve by a wastegate actuator to adjust an opening degree of the wastegate valve as previously detected and changing a flow-path sectional area of the by-pass passage based on the target opening degree as previously determined.

* * * * *